United States Patent
Kawata et al.

(10) Patent No.: US 8,218,024 B2
(45) Date of Patent: Jul. 10, 2012

(54) SOLID STATE CAMERA AND SENSOR SYSTEM AND METHOD

(75) Inventors: Tadashi Kawata, Tokyo (JP); Michinori Ichikawa, Tokyo (JP); Fumio Kubo, Tokyo (JP); Yutaka Ishiyama, Tokyo (JP); Ryouhei Ikeno, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 464 days.

(21) Appl. No.: 11/867,121

(22) Filed: Oct. 4, 2007

(65) Prior Publication Data
US 2008/0170142 A1  Jul. 17, 2008

(30) Foreign Application Priority Data
Oct. 12, 2006  (JP) ................................. 2006-278446

(51) Int. Cl.
*H04N 5/228* (2006.01)
(52) U.S. Cl. ............... 348/222.1; 348/194; 348/362; 348/304; 348/155; 348/156
(58) Field of Classification Search .............. 348/155, 348/156, 222.1, 294, 362, 304, 308, 373–376
See application file for complete search history.

(56) References Cited

U.S. PATENT DOCUMENTS

| | | | |
|---|---|---|---|
| 6,308,015 B1 * | 10/2001 | Matsumoto | 396/106 |
| 2002/0145665 A1 | 10/2002 | Ishikawa et al. | |
| 2003/0035059 A1 * | 2/2003 | Suzuki | 348/362 |
| 2006/0192938 A1 * | 8/2006 | Kawahito | 356/5.03 |

FOREIGN PATENT DOCUMENTS

| | | |
|---|---|---|
| JP | 2000075030 | 3/2000 |
| JP | 2002314989 | 10/2002 |
| JP | 2003067752 | 3/2003 |
| JP | 2005182137 | 7/2005 |

* cited by examiner

*Primary Examiner* — Yogesh Aggarwal
(74) *Attorney, Agent, or Firm* — Kenealy Vaidya LLP

(57) ABSTRACT

The disclosed subject matter is directed to solid state cameras and sensor systems that include a pickup surface thereof with both a distance detecting area for measuring a distance from a moving object and a movement detecting area for detecting the object's movement. The device can also include an optical communication area for communicating with an outside communication device. Therefore, the device enables a single pickup surface to include at least the following three functions: distance measurement; movement detection; and optical communication. The above-described sensor systems can output a control signal for collision avoidance with stationary or moving obstacle(s) by using the solid state camera. Because the sensor system can be integrated as a single chip IC with a small size, the system is useful as a sensor device in a vehicle, a robot, and the like.

24 Claims, 14 Drawing Sheets

SYSTEM CONFIGURATION

Fig.7
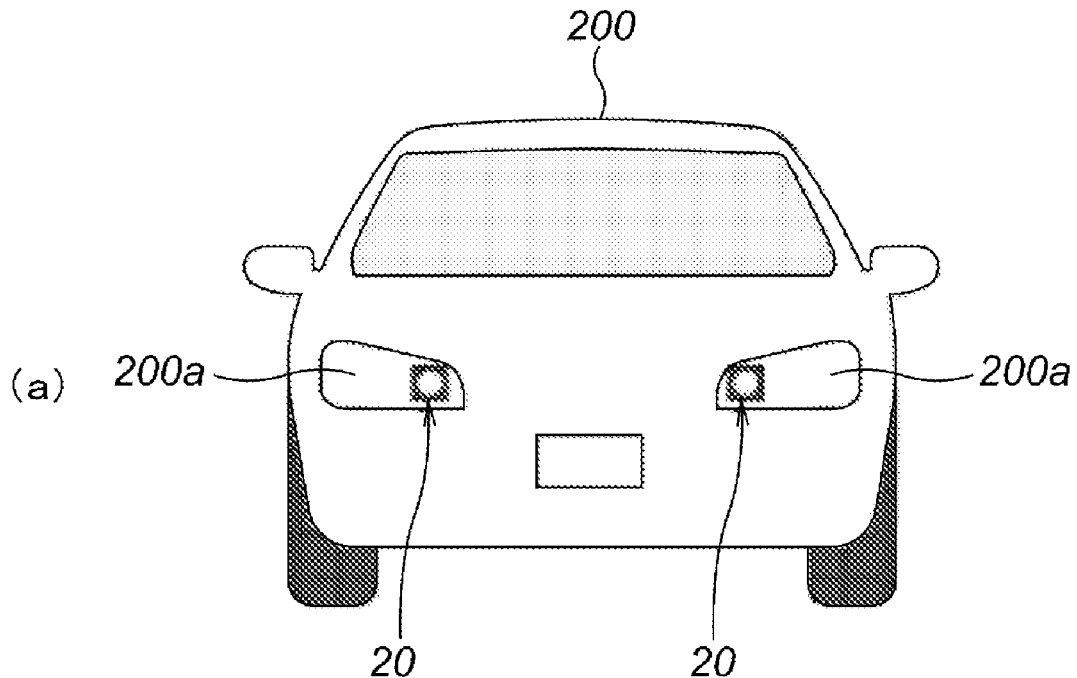
(a) An exemplary embodiment for fixing in a vehicle headlight
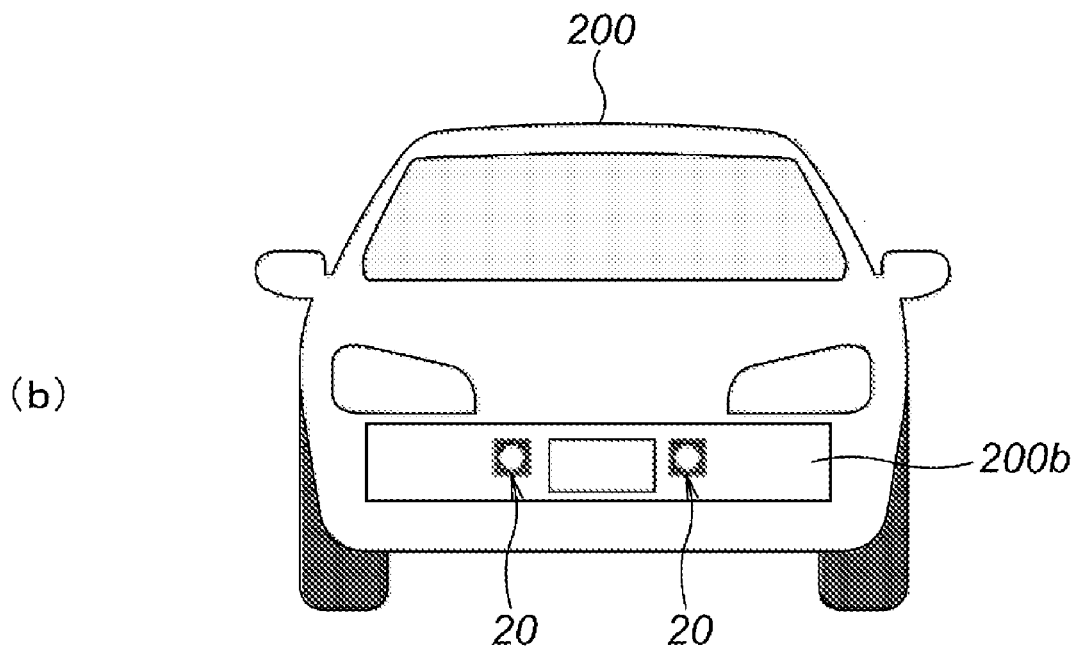
(b) An exemplary embodiment for fixing to a front bumper

Fig.8
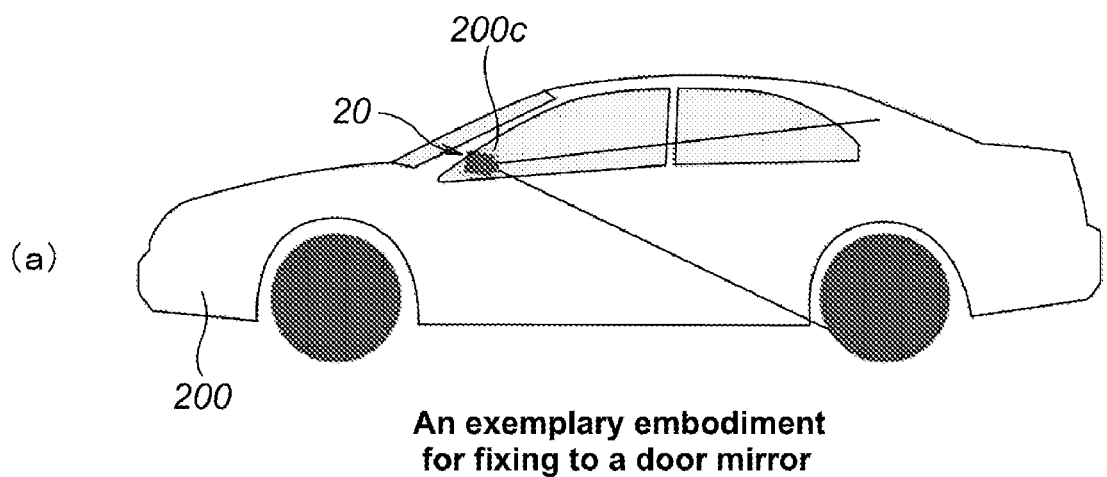
(a) An exemplary embodiment for fixing to a door mirror
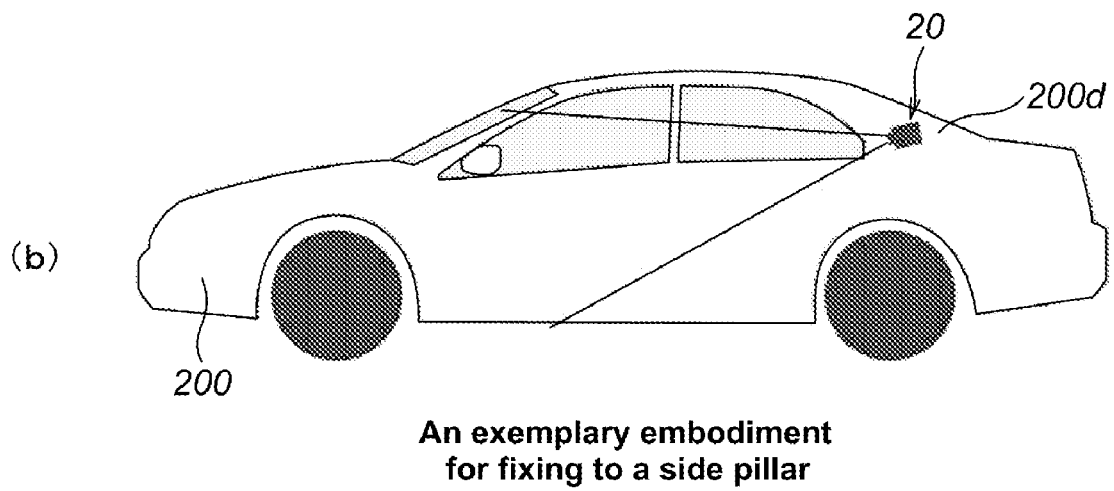
(b) An exemplary embodiment for fixing to a side pillar

Fig.9
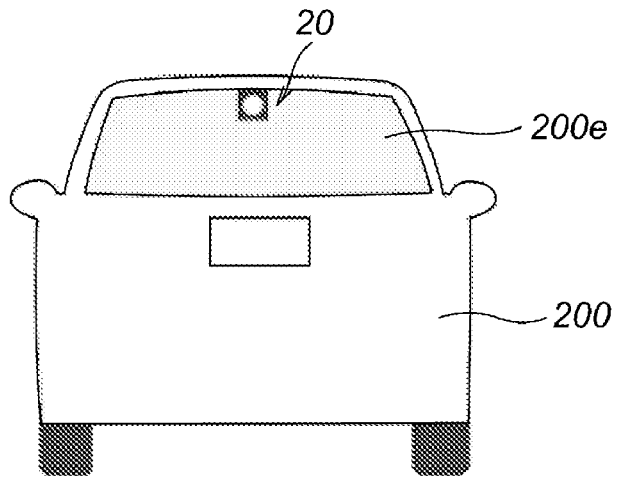
(a) An exemplary embodiment for fixing in a vehicular room
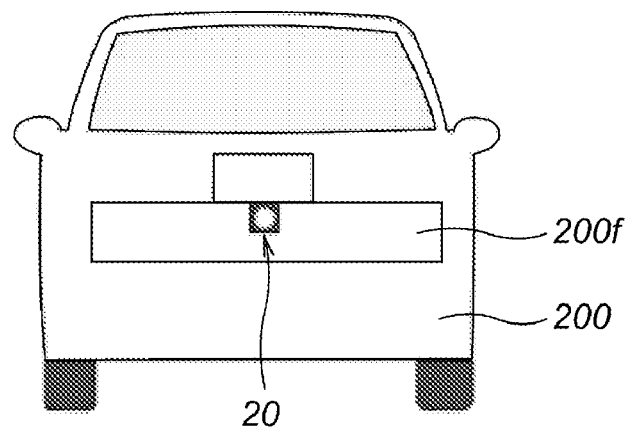
(b) An exemplary embodiment for fixing to a rear bumper
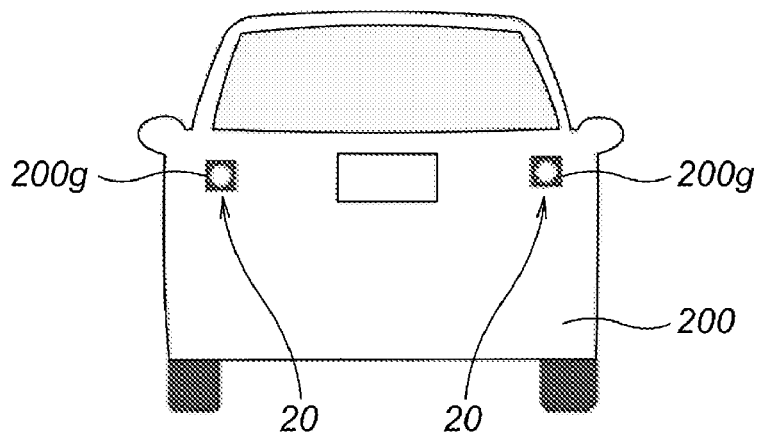
(c) An exemplary embodiment for fixing in a taillight

Fig.14
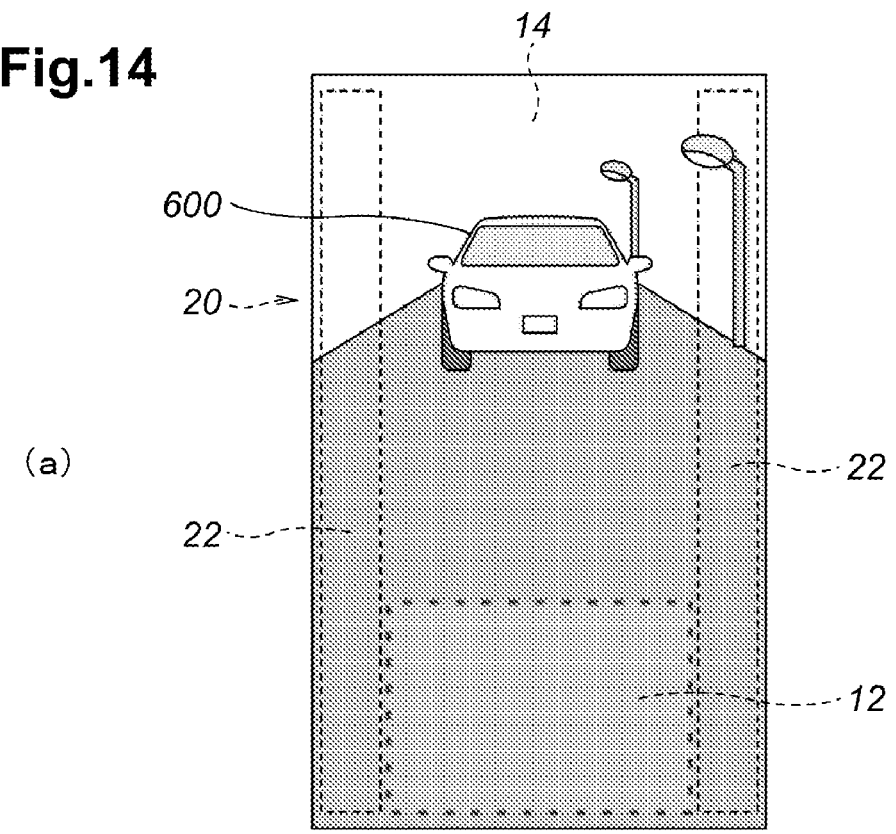
(a)
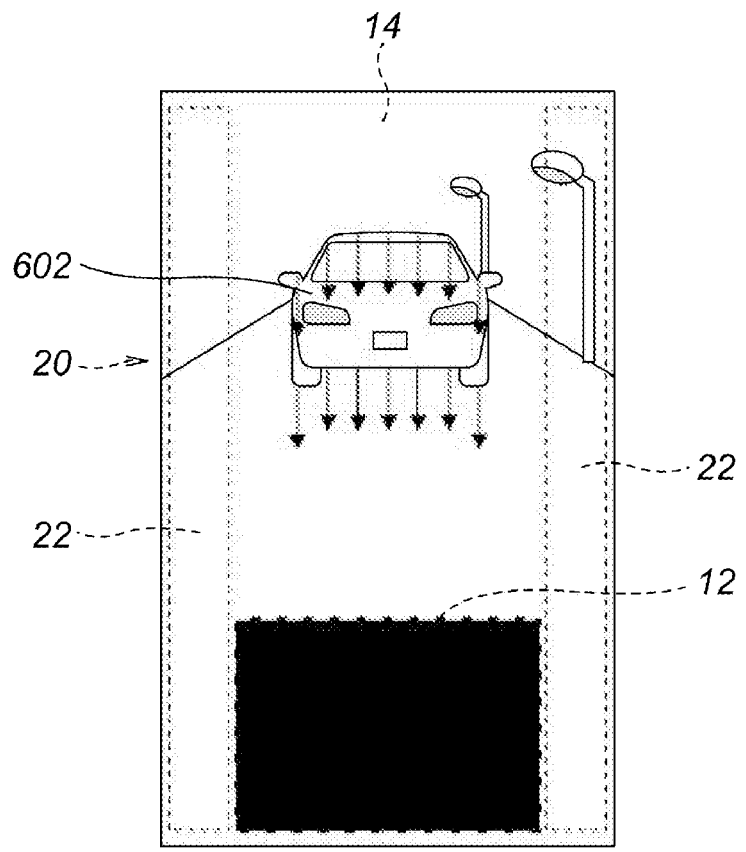
(b)

Fig.15
(a)
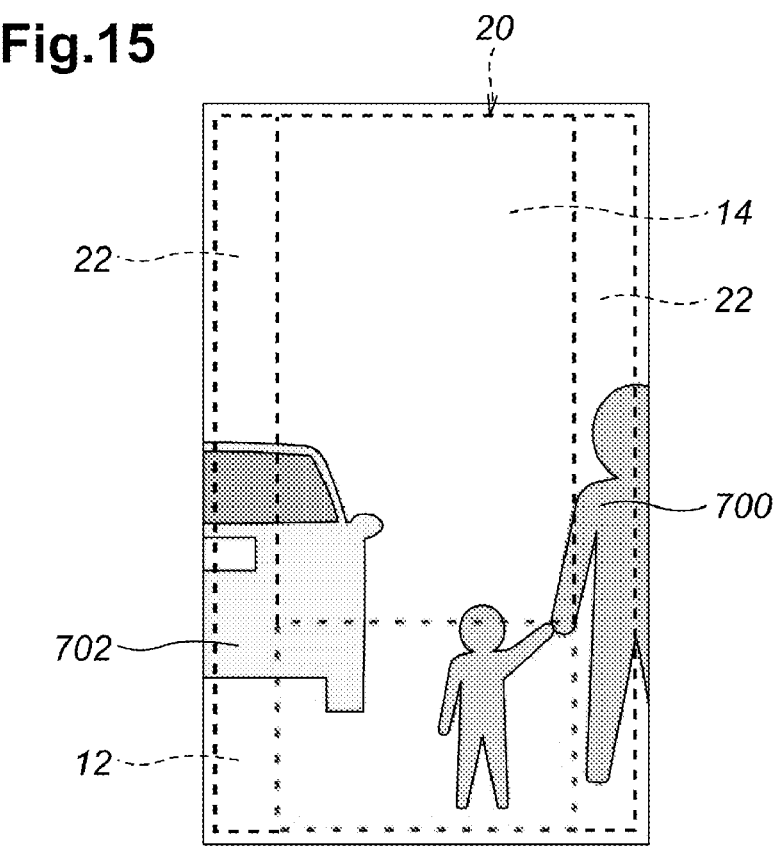
(b)
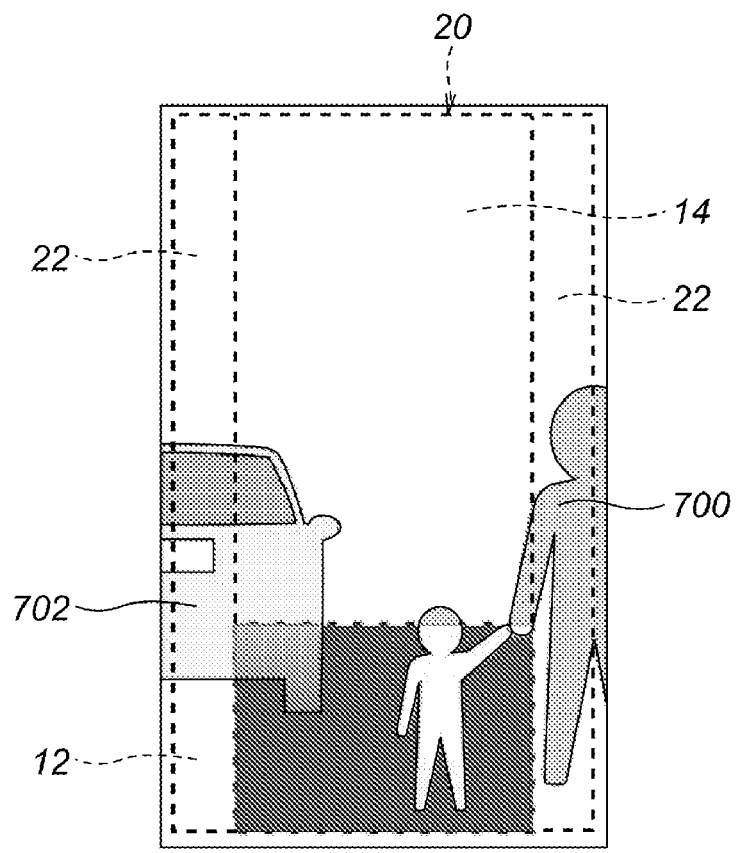

SOLID STATE CAMERA AND SENSOR SYSTEM AND METHOD

This application claims the priority benefit under 35 U.S.C. §119 of Japanese Patent Application No. 2006-278446 filed on Oct. 12, 2006, which is hereby incorporated in its entirety by reference.

BACKGROUND

1. Field

The presently disclosed subject matter relates to a solid state camera, and a sensor system comprising the same, which can be used whenever moving objects are detected in or near a vehicle, a robot and the like.

2. Description of the Related Art

A conventional method for detecting movement (a direction and a speed) of an object that is moving (hereinafter referred to as the "moving object") is disclosed, for example, in patent document No. 1 (Japanese Patent Application Laid Open JP2003-67752), patent document No. 2 (Japanese Patent Application Laid Open JP2002-314989) and etc. The disclosed conventional method is: photographing the moving object by means of a CCD camera and the like; storing serial image data of the moving object in a memory; carrying out a pattern matching between a present image datum and a previous image datum by an operating circuit; and detecting the movement of the moving object by evaluating the pattern matching results.

A conventional method for measuring a distance from an object such as the above-described moving object is also disclosed, for example, in patent document No. 3 (Japanese Patent Application Laid Open JP2005-182137), patent document No. 4 (Japanese Patent Application Laid Open JP2000-75030) and etc. The disclosed conventional method is: emitting lights using EHF (extremely high frequency) radar, a laser radar, etc., towards an object; detecting the reflective light reflected from the object; and calculating the distance by measuring a time from emitting the light to detecting the reflective light.

In the conventional methods described above, when detecting both the movement of the moving object and the distance from it, both an apparatus for detecting the movement and an apparatus for detecting the distance are respectively required. Thus, the conventional methods may result in some problems such as a size maximization of the apparatus, high cost, etc.

In addition, when the laser radar is used for detecting the distance, the laser is required to scan. A configuration that may be necessary to allow the laser to scan may further result in complicating the apparatus. The following conventional art documents described above provide a general background in the relevant art for the presently disclosed subject matter:

1. Patent document No. 1: Japanese Patent Application Laid Open JP2003-67752
2. Patent document No. 2: Japanese Patent Application Laid Open JP2002-314989
3. Patent document No. 1: Japanese Patent Application Laid Open JP2005-182137
4. Patent document No. 2: Japanese Patent Application Laid Open JP2000-75030

The disclosed subject matter has been devised to consider the above and other problems and characteristics. Thus, an embodiment of the disclosed subject matter can include a solid state camera for detecting both the movement of the moving object and the distance from it, and can realize a simple configuration with a low cost. The solid state camera can further include a receiver for an optical communication.

Another embodiment of the disclosed subject matter can include a sensor system using the above described solid state camera. The sensor system can detect both a movement of the moving object and a distance from it, and can also realize an optical communication with a low cost for use in a vehicle, a robot, security system and the like.

SUMMARY OF THE DISCLOSED SUBJECT MATTER

The presently disclosed subject matter has been devised in view of the above described characteristics, problems and the like. An aspect of the disclosed subject matter includes a solid state camera, which provides a pickup surface thereof with both a distance detecting area for measuring a distance from the moving object and a movement detecting area for detecting the movement of the moving object. In addition, the solid state camera can further provide a pickup surface thereof with an optical communication area for communicating with an outside communication device.

In the solid state camera of the disclosed subject matter, the pickup surface including all the above described areas can take image data photographed thereby. However, both data formation for distance measurement and data output are carried out by the distance detecting area. The movement detecting area carries out both data formation for detecting a movement of the moving object and data output, and the optical communication area carries out both data formation for an optical communication and data output. Thus, a solid state camera of the disclosed subject matter enables the pickup surface to output data for detecting both a distance from the moving object and its movement, and to receive optical communication data.

Another aspect of the disclosed subject matter includes a sensor system comprising the above described solid state camera. The sensor system can detect both a distance from the moving object and its movement, and can further carry out an optical communication with the solid state camera. Thus, the sensor system can be used for various sensors in a vehicle, a robot, a security system and the like.

According to another aspect of the disclosed subject matter, a solid state camera including a pickup surface for photographing an object can include: a distance detecting area that is assigned on the pickup surface, the distance detecting area including solid state photo-chips that are configured to detect a distance from the object; and a movement detecting area that is assigned on the pickup surface, the movement detecting area including solid state photo-chips that are configured to detect movement of the object.

The immediately above described solid state camera can further include an optical communication area that is assigned on the pickup surface, the optical communication area including solid state photo-chips that are configured to receive optical communication data.

Another of the aspects of the disclosed subject matter can include a solid state camera, wherein each solid state photo-chip size in the distance detecting area is bigger than each photo-chip size in other areas. At least one area of all areas on the pickup surface of the solid state camera can receive image data that is photographed thereby, and the solid state photo-chips in the at least one area can be CMOS chips.

According to another aspect of the disclosed subject matter, a sensor system including the solid state camera described in paragraphs above can include: a light source device that emits light to detect a distance from an object; an operating circuit, which is configured to input at least one of distance data and flow data that are outputted from the solid state camera, to output feedback signals of the distance data, and to output obstacle data; a synchronizing circuit that is configured to cause the light source device to emit, of which signals synchronize with the feedback signals of the distance data outputted from the operating circuit; and a control circuit, which is configured to input the obstacle data outputted from the operating circuit and to output a control signal.

The immediately above described sensor system can include the solid state camera described in paragraphs. Thus, the sensor system can further include: an encoder that is configured to encode transmitting data and to output communication data to the synchronizing circuit; and a decoder that is configured to decode receiving data outputted from the solid state camera and to output control data.

BRIEF DESCRIPTION OF THE DRAWINGS

The above and other characteristics and features of the disclosed subject matter will become clear from the following description with reference to the accompanying drawings, wherein:

FIGS. 7(a)-(b) are explicative diagrams showing exemplary embodiments for fixing solid state cameras made in accordance with principles of the disclosed subject matter to a vehicle as a front detective sensor;

FIGS. 8(a)-(b) are explicative diagrams showing exemplary embodiments for fixing solid state cameras made in accordance with principles of the disclosed subject matter to a vehicle as a side detective sensor;

FIGS. 9(a)-(c) are explicative diagrams showing exemplary embodiments for fixing solid state cameras made in accordance with principles of the disclosed subject matter to a vehicle as a rear detective sensor;

FIGS. 14(a)-(b) are explicative diagrams showing additional exemplary operations of a solid state camera made in accordance with principles of the disclosed subject matter; and FIGS. 15(a)-(b) are explicative diagrams showing additional exemplary operations of a solid state camera made in accordance with principles of the disclosed subject matter.

DETAILED DESCRIPTION OF EXEMPLARY EMBODIMENTS

Figure 1:
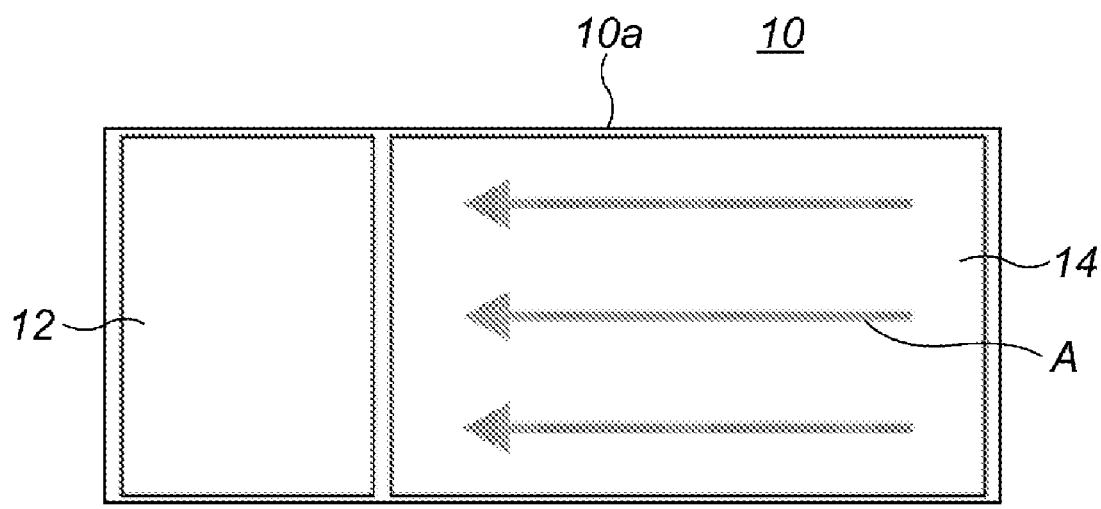
FIG. 1 is an explicative diagram showing a configuration of a pickup surface of a solid state camera in accordance with an exemplary embodiment of the disclosed subject matter.

Exemplary embodiments of the disclosed subject matter will now be described in detail with reference to FIGS. 1-15. FIG. 1 is an explicative diagram showing an exemplary configuration of a pickup surface of a solid state camera made in accordance with principles of the disclosed subject matter.

While a pickup surface of a conventional solid state camera is configured with a single pickup area, a pickup surface 10a of the solid state camera 10 in accordance with the disclosed subject matter can be configured with a plurality of pickup areas. Thus, the solid state camera of the disclosed subject matter can be different from conventional solid state cameras in terms of dividing a pickup surface 10a into a plurality of pickup areas.

The pickup surface 10a of the solid state camera 10 can be divided between a distance detecting area 12 and a movement detecting area 14 as shown in FIG. 1. The distance detecting area 12 can be located on the left of the pickup surface 10a and can be specialized to detect a distance from an object, such as a moving object, etc. The movement detecting area 14 can be located on the right of the pickup surface 10a and can be specialized to detect a movement of an object, such as a moving object, etc. The movement detecting area 14 can also include a receiver for an optical communication.

Thus, the solid state camera 10 can be configured to assign each detecting area to the respective necessary functions than to simply divide the pickup surface 10a into each detecting area, and can be configured to assign each detecting area of the pickup surface 10a in the design process of the solid state camera 10. The pickup surface 10a can be substantially rectangular and can be wider in a horizontal direction. For example, the pickup surface 10a can be created in a 4:3 width-height ratio.

The distance detecting area 12 can be located on the left of the pickup surface 10a as described above and can occupy an area of from approximately one-fourth to one-third with respect to the whole area of the pickup surface 10a. The distance detecting area 12 can receive reflective lights and can output distance data, as described later. In addition, the distance detecting area 12 can also receive image data for distance measurement and the like.

The movement detecting area 14 can be located on the right of the pickup surface 10a as shown in FIG. 1 and can occupy an area outside that of the distance detecting area 12 on the pickup surface 10a. The movement detecting area 14 can receive image data and can output flow data for detecting a movement of the moving object, as described later. The movement detecting area 14 can also operate as a receiver for an optical communication.

As described above, the solid state camera 10 can include both the distance detecting area 12 for the distance measurement and the movement detecting area 14 for detecting the movement on the single pickup surface 10a. In other words, the solid state camera 10 can detect both the distance from an object and its movement synchronously by photographing it. Furthermore, the movement detecting area 14 can also receive optical communication data along with receiving image data for detecting movement.

Figure 2:
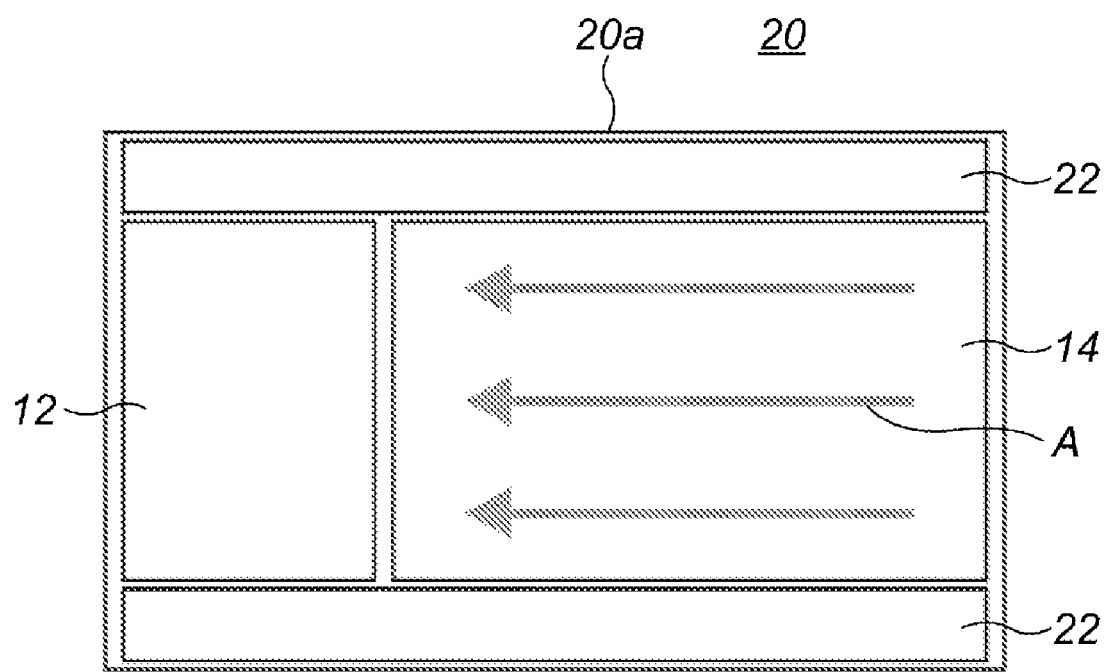
FIG. 2 is an explicative diagram showing another configuration of a pickup surface of a solid state camera in accordance with an exemplary embodiment of the disclosed subject matter.

FIG. 2 is an explicative diagram showing another configuration/embodiment of a pickup surface of a solid state camera made in accordance with principles of the disclosed subject matter. In FIG. 2, the same or corresponding elements of the solid state camera 10 described above use the same reference marks as reference marks used in the solid state camera 10 described above, and therefore their description and operation are abridged in the following description.

The solid state camera 20 can include an optical communication area 22 along with a distance detecting area 12 and a movement detecting area 14 on a pickup surface 20*a*. The configuration of the optical communication area 22 is a difference between the solid state camera 10 and 20. The optical communication area 22 can be located over and under both the distance detecting area 12 and the movement detecting area 14, and can be specialized to communicate with an outside communication device.

More specifically, the optical communication areas 22 can be located on top of both the distance detecting area 12 and the movement detecting area 14 and underneath them, and can be configured to extend horizontally from a left end to a right end on the pickup surface 20*a*. The optical communication area 22 can receive lights and can output control data for an optical communication, described later. The optical communication area 22 can also receive image data along with receiving optical communication data synchronously.

As described above, the solid state camera 20 can include the distance detecting area 12 for the distance measurement, the movement detecting area 14 for detecting the movement and the optical communication area 22 for receiving communication data on the single pickup surface 20*a*. Thus, the solid state camera 20 can further communicate with an outside communication device along with detecting both the distance from an object and its movement synchronously by photographing it. In other words, the solid state camera 20 can include three functions: a distance detecting function; a movement detecting function; and an optical communication function on the single pickup surface 20*a*. Furthermore, the optical communication area 22 can also receive image data.

A method of distance measurement using the distance detecting area 12 will be now given in detail. The distance detecting area 12, for example, can be configured to measure a distance from an object by TOF (Time of flight) method. In this case, the distance detecting area 12 can include a conventional CMOS device configuration, for example, the CMOS configuration disclosed in Japanese Patent Application Laid Open JP2005-295381.

TOF method is a technique for measuring a distance from an object by measuring a time from emitting a light towards an object to detecting the reflective light against the object. Because a distance depends on a flight time of a light, the immediately above described time allows measuring the distance from the object.

In the TOF method, a light source can be configured as an LED, a laser and the like that can driven with a high speed PWM. The distance detecting area 12 can receive the reflective light of a light emitted from the light source towards an object and can output distance data for measuring the distance. The above distance data can be inputted to an operating circuit, described later, which can calculate a real distance from the distance data by the TOF method. Because the distance detecting area 12 may be required to increase a detecting efficiency of the reflective light and may be required to proceed with a high speed, a resolution of the distance area 12 is basically rougher than of other areas.

A method for detecting a movement in the movement detecting area 14 will now be described in detail. The movement detecting area 14 can be configured to detect movement by an optical flow technique. Optical flow is a technique which can detect movement by comparing an image datum with the previous image datum that is serially photographed by a solid state camera.

More specifically, the optical flow technique involves using a vector data expressing movements of the object in a serial image data. In detail, flow data of the optical flow is as follows: extracting characteristic points of the object at a time t; detecting the positions of the characteristic points at a time dt after the time t; detecting moving directions and moving distances of the characteristic points; and vector data extracted from the immediately above described moving directions and moving distances. When the object moves straightaway, the optical flow data moves so as to expand from a vanishing point in image data or so as to contract towards the vanishing point.

The movement detecting area 14 can: photograph the object; form image data of the object; store the image data in a memory; detect vector data of the object; and output the flow data to an operating circuit, described later. In this case, the movement detecting area 14 can be configured to detect the vector data in a direction A shown in FIGS. 1 and 2. The flow data can be formed in the movement detecting area 14 as described above, however, the operating circuit can also form the flow data by inputting a serial image data outputted from the movement detecting area 14.

The optical communication area 22 can be specifically configured to communicate by an optical communication method, for example, that which is disclosed in Japanese Patent Application Laid Open JP2003-332595, Japanese Patent Application Laid Open JP2005-182455, etc. The optical communication area 22 can: receive optical data for an optical communication data; form receiving data from the optical data; and output the receiving data to a decoder, described later, that can decode the receiving data. The optical communication area 22 can also receive image data for the optical communication, movement detection, and the like.

A description of solid state photo-chips that can be used in the distance detecting area 12, the movement detecting area 14, and the optical communication area 22 of the solid state cameras 10 and 20 will now be given with reference to FIG. 3. The solid state photo-chips can include, for example, CCD chips, and CMOS chips that can read with a high speed and can also read a part of each area. Thus, CMOS chips can be useful photo-chips in all of the above described areas. The optical communication area 22 can also use photo diodes, photo transistors, etc., for carrying out an operation thereof in an area outside of the pickup surfaces 10*a* and 20*a*. Therefore, photo-chip size in the optical communication area 22 is not shown in FIG. 3.

Figure 3:
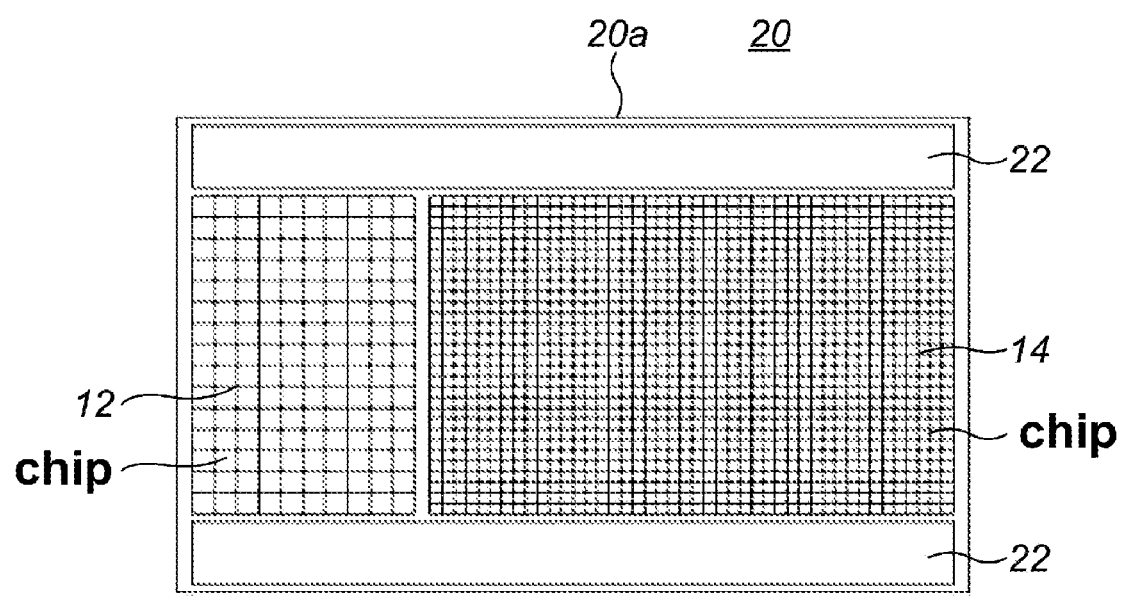
FIG. 3 is an explicative diagram showing a photo-chip size in a distance detecting area, a movement detecting area and an optical communication area of a solid state camera made in accordance with principles of the disclosed subject matter.

When CCD chips, CMOS chips and the like are used in each area of the pickup surface 10*a* and 20*a*, the photo-chip size in the distance detecting area 12 can be bigger than that of other areas, as shown in FIG. 3. The distance detecting area 12 may be utilized to detect a distance from an object by reading the reflective light reflected against the object with an ultra-high speed. Thus, the bigger size of the photo-chips in the distance detecting area 12 enables the solid state camera 10 and 20 of the disclosed subject matter to detect the above described distance with a very high speed.

The movement detecting area 14 can detect a movement of an object with high speed and can detect vector data of the object in all directions. However, higher detection speeds can be realized when detecting movement in a single direction A as shown in FIGS. 1 and 2.

Figure 4:
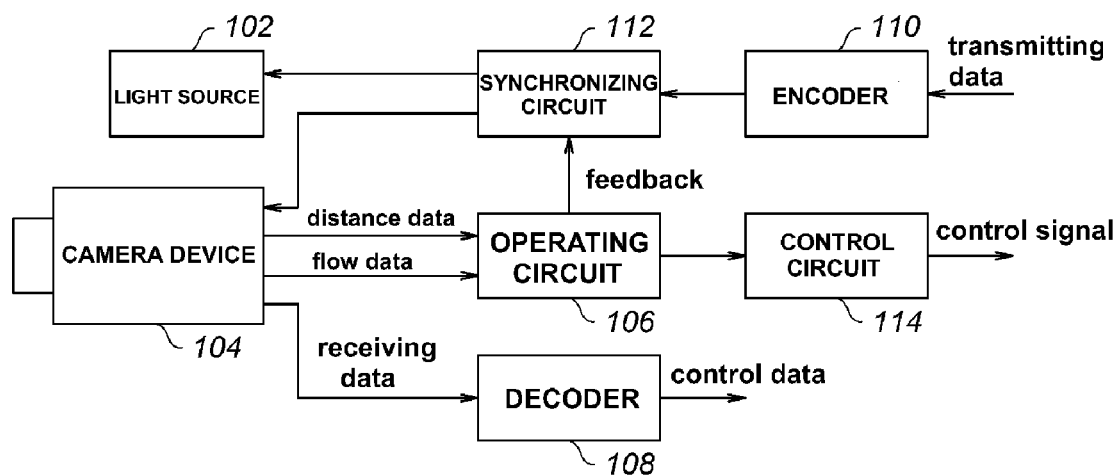
FIG. 4 is a block circuit diagram showing an exemplary embodiment of a sensor system including a solid state camera made in accordance with principles of the disclosed subject matter.

A sensor system including the solid state camera 20 will now be given in detail with reference to FIG. 4. FIG. 4 is a block circuit diagram showing an exemplary embodiment of a sensor system including a solid state camera made in accordance with principles of the disclosed subject matter.

A sensor system 100 can include: a light source 102 which can include an LED, a laser, and the like, which emits light towards an object for detecting a distance from the object thereto and transmits communication data for an optical communication; a camera device 104 including the solid state camera 20 that includes the distance detecting area 12, the movement detecting area 14 and the optical communication area 22; an operating circuit 106 that inputs the distance data outputted from the distance detecting area 12, inputs the flow data outputted from the movement detecting area 14 and outputs feedback signals of the distance data and obstacle data; a decoder 108 that inputs receiving data outputted from the optical communication area 22 and outputs control data; an encoder 110 that encodes transmitting data and outputs communication data; a synchronizing circuit 112 that synchronizes light-emitting signals for the light source 102 with the feedback data outputted from the operating circuit 106 and the communication data; and a control circuit 114 that inputs the obstacle data outputted from the operating circuit 106 and outputs a control signal.

In the above described system configuration shown by FIG. 4, the sensor system 100 can emit light from the light source 102 in accordance with the light-emitting signals outputted from the synchronizing circuit 112 for synchronizing the camera device 104. The sensor system 100 can receive the reflective data reflected against an object with the camera device 104, and can receive the movement data and the optical communication data.

Thus, the camera device 104 can output the following three data in accordance with the above described data. The first data can be a distance data formed in the distance detecting area 12 of the solid state camera 20, the second data can be a flow data formed in the movement detecting area 14 of the solid state camera 20, and the third data can be a receiving data formed in the optical communication area 22 of the solid state camera 20.

Both the distance data and the flow data can be inputted to the operating circuit 106, which can carry out an obstacle-detection process, etc., using both sets of data and can output the obstacle data to the control circuit 114. The control circuit 114 can output the control signal in accordance with the obstacle data outputted from the operating circuit 106 thereto.

Both the distance data and the flow data can be changed during usage. For example, each of the distance data and the flow data can be respectively used and can be used synchronously. Thus, the sensor system 100 can carry out an operating process corresponding to the use in the operating circuit 106 and can output the obstacle data of the operating process result to the control circuit 114.

The receiving data outputted from the camera device 104 can be inputted to the decoder 108, which can decode the receiving data and can output the control data. The transmitting data can be encoded by the encoder 110 and can be inputted to the synchronizing circuit 112, which can output the light-emitting signals to the light source 102. Because it is not necessary for the sensor system 100 including the solid state camera 10 shown by FIG. 1 to communicate with an outside communication device, both the decoder 108 and the encoder 110 can be eliminated from the sensor system 100.

Figure 5:
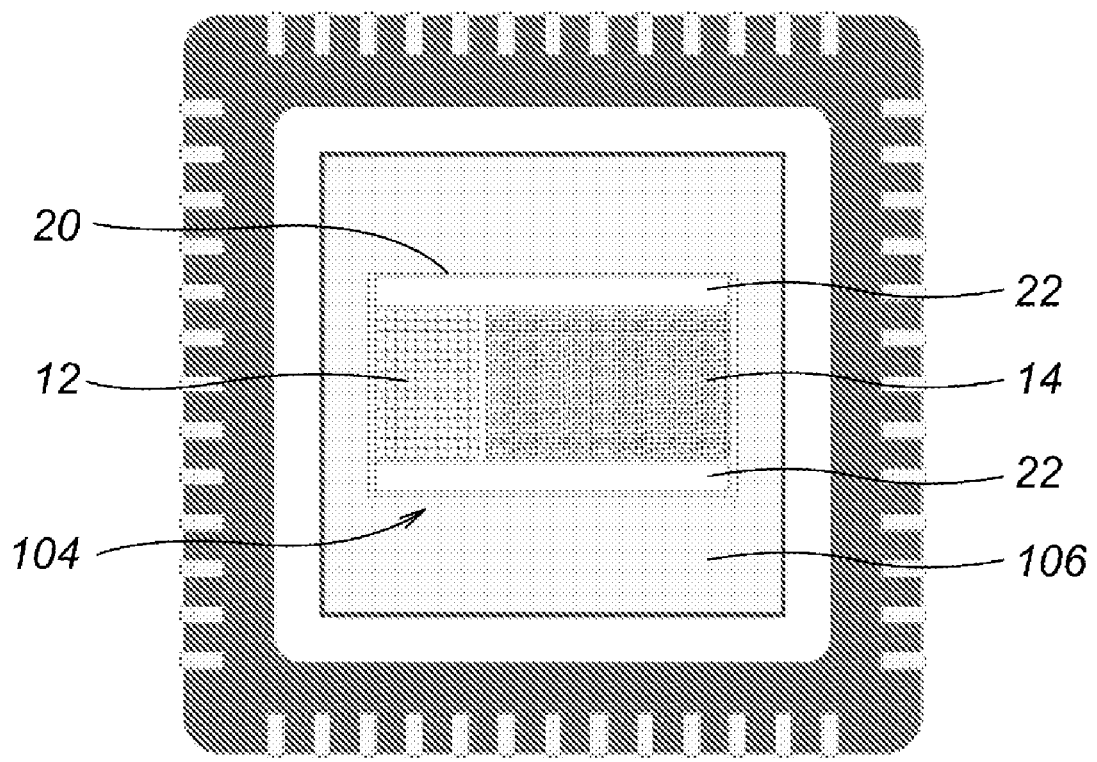
FIG. 5 is a schematic diagram showing an exemplary embodiment of a single chip IC integrated in the sensor system shown by FIG. 4.

FIG. 5 is a schematic diagram showing an exemplary embodiment of a single chip IC integrated into the sensor system of FIG. 4. The single chip IC can be configured such that the camera device 104 including the solid state camera 20 can be located on a central portion thereof and the operating circuit 106 and other circuits can be located around the camera device 104.

Figure 6:
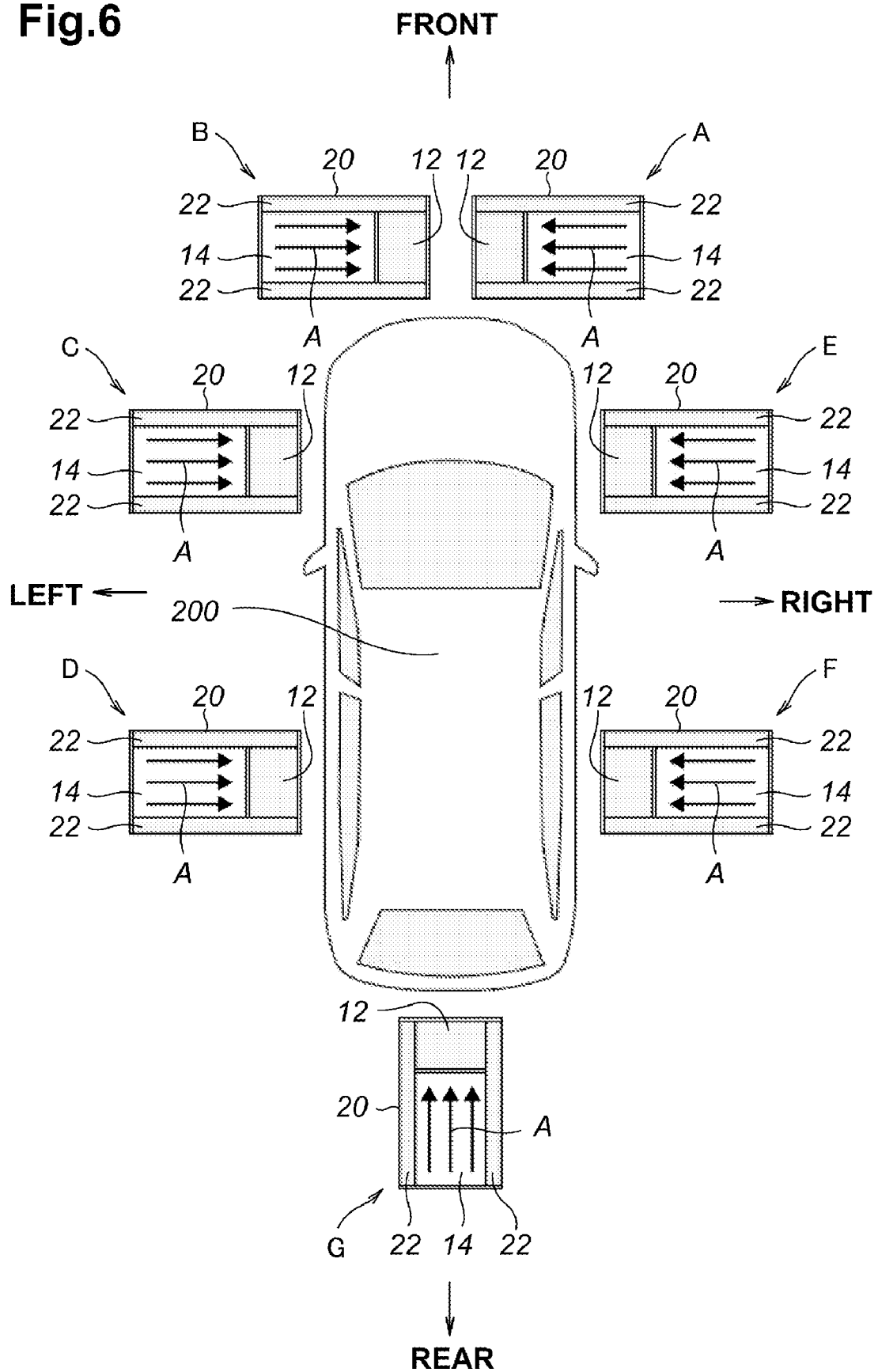
FIG. 6 is an explicative diagram showing an exemplary embodiment for fixing seven solid state cameras made in accordance with principles of the disclosed subject matter to a vehicle as a sensor system shown by FIG. 4.

Exemplary embodiments for using the sensor system 100 including the solid state camera 10 or 20 in a vehicle will now be given in detail with reference to FIGS. 6-15. FIG. 6 is an explicative diagram in top view of a vehicle and is an explicative diagram showing an exemplary embodiment for fixing seven solid state cameras 20 made in accordance with principles of the disclosed subject matter to a vehicle 200 as a sensor system shown by FIG. 4.

More specifically, the solid state cameras 20 shown by marks A and B can be fixed to the vehicle 200 for watching forwards, the solid state cameras 20 shown by marks C and D can be fixed for watching leftwards, the solid state cameras 20 shown by marks E and F can be fixed for watching rightwards, and the solid state camera 20 shown by G can be fixed for watching backwards. When fixing the solid state camera 10 or 20, a specific fixing direction thereof will be described later in detail because the fixing direction is important.

Exemplary embodiments for fixing the solid state cameras 20 to the vehicle 200 are shown in FIGS. 7-9. Specifically, FIG. 7 is an explicative diagram showing exemplary embodiments for fixing the solid state cameras 20 made in accordance with the disclosed subject matter to the vehicle 200 as a front detective device. The solid state cameras 20 can be fixed in a vehicle headlight 200a as shown in FIG. 7(*a*), can be fixed to a front bumper 200b as shown in FIG. 7(*b*), and can be also fixed in the vehicular room or cabin in front view of the vehicle 200, etc.

FIG. 8 is an explicative diagram showing exemplary embodiments for fixing the solid state cameras 20 made in accordance with the disclosed subject matter to the vehicle 200 as a side detective device. The solid state camera 20 can be fixed to a door mirror 200c as shown in FIG. 8(*a*), can be fixed to a side pillar 200d, and can also be fixed in positions that can watch sideward in the headlight or the taillight, etc.

FIG. 9 is an explicative diagram showing exemplary embodiments for fixing the solid state camera 20 to the vehicle 200 as a rear detective device. The solid state camera 20 can be fixed in a vehicular room or cabin, for instance, to a rear window 200e as shown in FIG. 9(*a*), can be fixed to a rear bumper 200f as shown in FIG. 9(*b*), can be fixed in a taillight 200g as shown in FIG. 9(*c*), and can be also fixed in a high mount stoplight, etc.

When fixing the solid state camera 20 to the vehicle 200, each area of location for the solid state camera 20 will now be described with reference to FIG. 10. An area location shown in FIG. 10(*a*) can include two solid state cameras 20 that couple each of the distance detecting areas 12 thereof in series. This area location can expand the distance detecting area 12 because it enables two distance detecting areas 12 to line in series.

Figure 10:
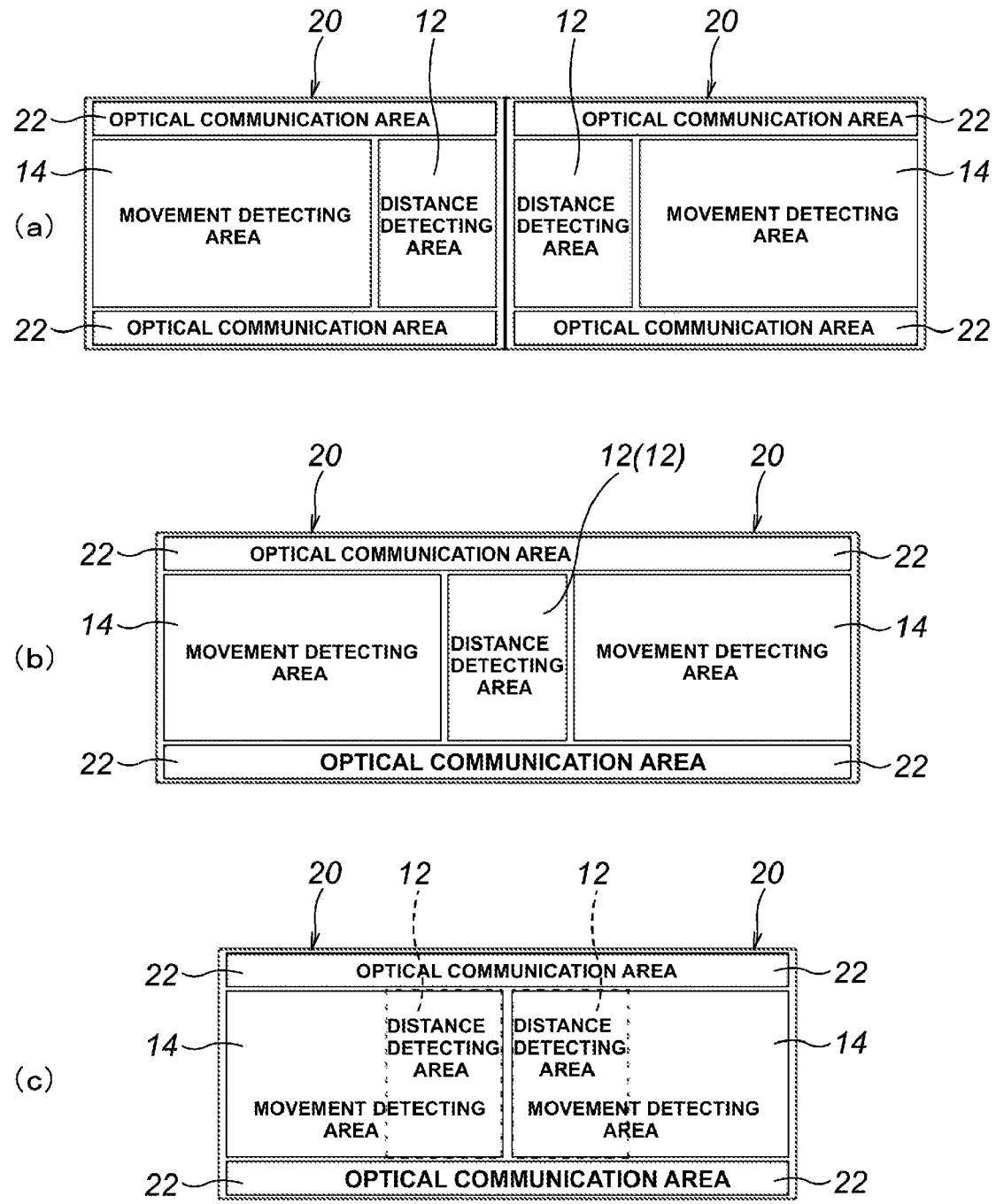
FIGS. 10(a)-(c) are explicative diagrams showing exemplary embodiments of a configuration of the solid state camera made in accordance with principles of the disclosed subject matter when fixing it as a vehicular sensor.

An area location shown in FIG. 10(*b*) can include the solid state camera 20 that expands the distance detecting area 12 between two movement detecting areas 14. This area location can increase a detecting efficiency of a distance with the single solid state camera 20. An area location shown in FIG. 10(*c*) can include the solid state camera 20 that couples two movement detecting areas 14 in series including the distance detecting area 12. This area location can take wide image data for detecting the movement of an object and can input overlapped image data of the distance data and the movement data to the solid state camera 20.

The pickup surface of the solid state camera 20 shown by FIGS. 10(a)-(c) can include the distance detecting area 12 on the central portion thereof, two movement detecting areas 14 on both sides of the detecting area 12, and the optical communication areas 22 on top and bottom portions of both the distance detecting areas 12 and the movement detecting areas 14.

When the solid state camera 20 shown by FIGS. 10(a)-(c) is employed for watching forwards as shown in FIGS. 7(a)-(b), the solid state camera 20 can detect distances from a vehicle and an obstacle in front of the vehicle 200 by the distance detecting area 12. Thus, the solid state camera 20 can be used as a sensor device for detecting an obstacle and a vehicle in front of the vehicle 200.

Furthermore, the solid state camera 20 can detect a moving object that crosses in front of the vehicle 200 with the movement area 14, and can detect a moving object that may prevent the vehicle 200 from moving forwards. For example, because the solid state camera 20 can also detect the movement of people that suddenly rush out in front of the vehicle 200, the solid state camera 20 can be used as a sensor device for detecting an obstacle that crosses in front of the vehicle 200.

The above described detection can be operated by the operating circuit 106 shown in FIG. 4 in accordance with the data outputted from the solid state camera 20. The operating circuit 106 can output the obstacle data to the control circuit 114, which can carry out a collision avoidance control, for example, a brake control, a steering gear control and the like.

The optical communication area 22 can receive optical communication data outputted from a traffic light, a street light, other infrastructure, etc. The decoder 108 can output the control data in accordance with the receiving data outputted from the optical communication area 22 of the solid state camera 20, and can provide a driver with necessary or desired information.

Figure 11:
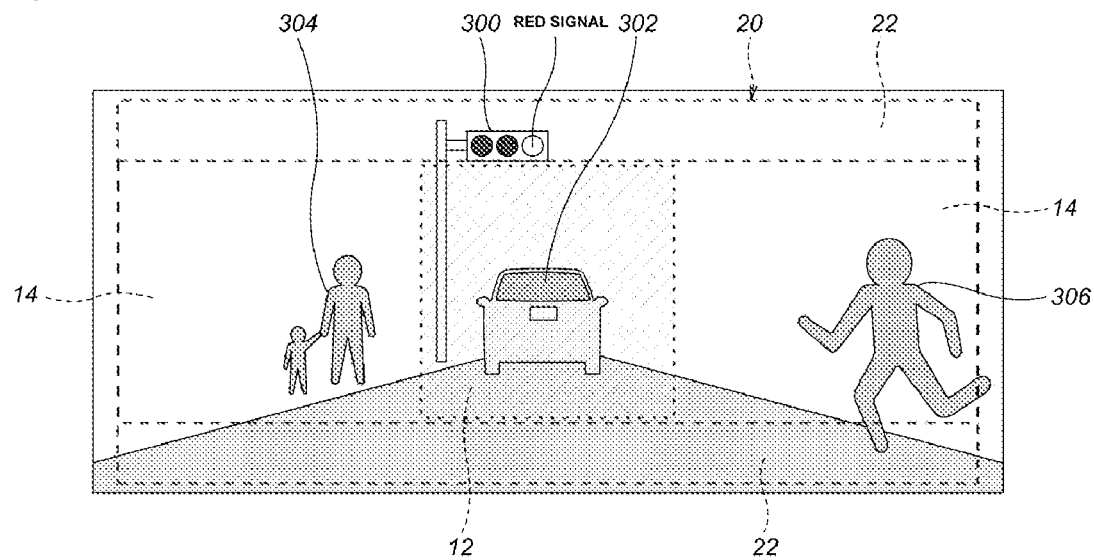
FIG. 11 is an explicative diagram showing an exemplary operation of a solid state camera made in accordance with principles of the disclosed subject matter.

A detecting operation of the solid state camera 20 in detecting a circumstance shown by FIG. 11 will be now given. In this case, when the solid state camera 20 shown by FIG. 10(b) is fixed to a front of the vehicle 200 and watches forwards, the detecting operation can be characterized as follows. Because a red signal of a traffic light 300 is lighted as shown in FIG. 11, a vehicle 302 stops in front of the vehicle 200. Pedestrians 304 also stop. However a pedestrian 306 is crossing the road whereon the vehicle 200 is driven forwards.

In the above described case, the sensor system 100 including the solid state camera 20 is configured to detect the movements of the pedestrians 304 and 306, to detect the distance from the vehicle 302, and to communicate with an infrastructure (e.g. the signal light 300) and the vehicle 302 simultaneously and in real time. Furthermore, the sensor system 100 is configured to judge the best solution using each of the detecting data and the communication data in order to reduce damage and/or prevent an unfavorable event.

The solid state camera 20 shown by FIG. 10(b) can detect the movement of both the stopping pedestrians 304 and the rushing pedestrian 306, can detect the distance from the forward vehicle 302 to the vehicle 200, and can also communicate with the infrastructure such as the signal light 300 and the vehicle 302 synchronously and in real time. Each of the detecting method and the communicating method will be described in more detail below.

Figure 12:
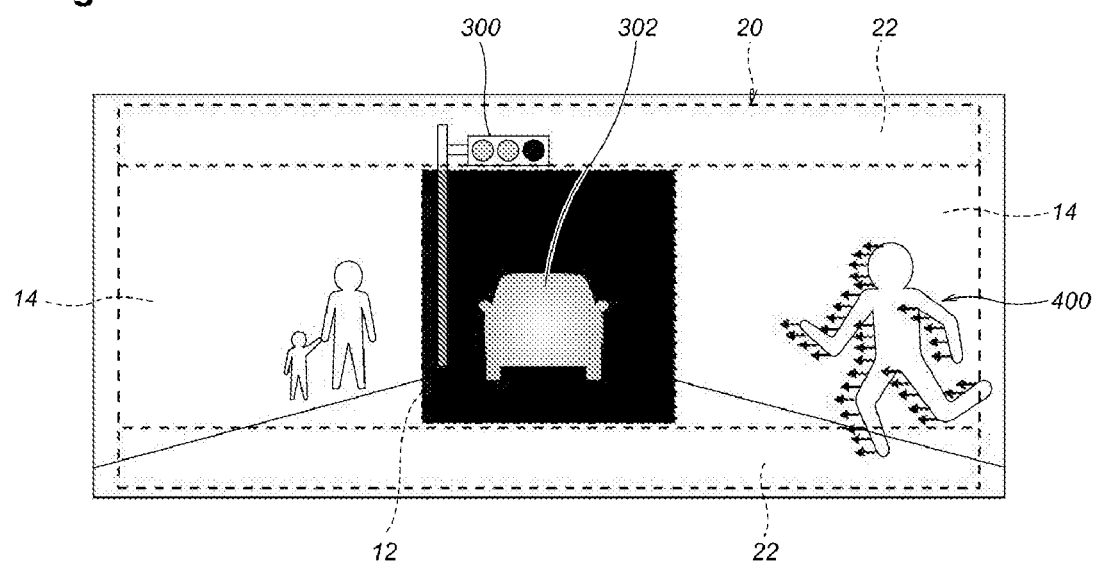
FIG. 12 is an explicative diagram showing another exemplary operation of a solid state camera made in accordance with principles of the disclosed subject matter.

When the pedestrian 306 is going to rush out leftwards, the rightward located pedestrian 306 in the image data that is photographed by the solid state camera 20 can be detected as the vector data 400 thereof, which is moving leftwards as shown in FIG. 12. The vector data 400 can be detected with the movement detecting area 14 that is located on the right side of the solid state camera 20, and can be outputted as flow data to the operating circuit 106. The operating circuit 106 can recognize the pedestrian 306 as an obstacle crossing over towards the drive path of the vehicle 200.

When the leftward pedestrians 304 begin to walk along the above described roadway, the leftward pedestrians 304 in the image data that are photographed by the solid state camera 20 can be also detected as vector data thereof, which is slowly moving outwards from the vehicle 200. The slow vector data can be detected with the movement detecting area 14 that is located on the left side of the solid state camera 20, however, they cannot be recognized as an obstacle because they are slowly moving outwards from the vehicle 200. In the above described exemplary situation, because the movement detecting area 14 can output flow data of the movement, the movement detecting area 14 is not required to output a great deal of image data.

When the solid state camera 20 detects the distance between the vehicle 200 and the forward vehicle 302, the solid state camera 200 can detect the distance by the above described TOF method. However, the distance detecting area 12 of the solid state camera 20 can also detect far and near distances from the vehicle 302 to the vehicle 200 with a gray scale of brightness as shown in FIG. 12. In the case when distance is detected as exceeding a predetermined threshold, the sensor system 100 can control, for example, the way in which the system provides the driver with warning information or actions.

The optical communication with an infrastructure and the like will now be given. The optical communication area 22 of the solid state camera 20 can detect a light of a taillight of the forward vehicle 302 and its stoplight, a light of a street light and a light of a traffic light 300, and can receive an optical communication data outputted from an outside communication device. For example, the sensor system 100 can avoid a collision against the vehicle 302 by receiving its braking information, speed information, etc., outputted from the vehicle 302.

Furthermore, because an LED can be employed as a light source of a traffic light, the LED can be configured to include information which allows a vehicle to receive the information as disclosed, for example, in Japanese Patent Application Laid Open JP2002-202741. For instance, the signal state of a traffic light, a time until changing the signal state, and the like, can be transmitted from a traffic light 300 such that the sensor system 100 can enable the vehicle 200 to prevent a traffic accident or other problem. The sensor system 100 allows the vehicle 200 to receive the information with the optical communication area 22 and to control the speed thereof. That is a reason why the vehicle 200 that is provided with the sensor system 100 made in accordance with principles of the disclosed subject matter can prevent traffic accidents and other traffic problems.

Figure 13:
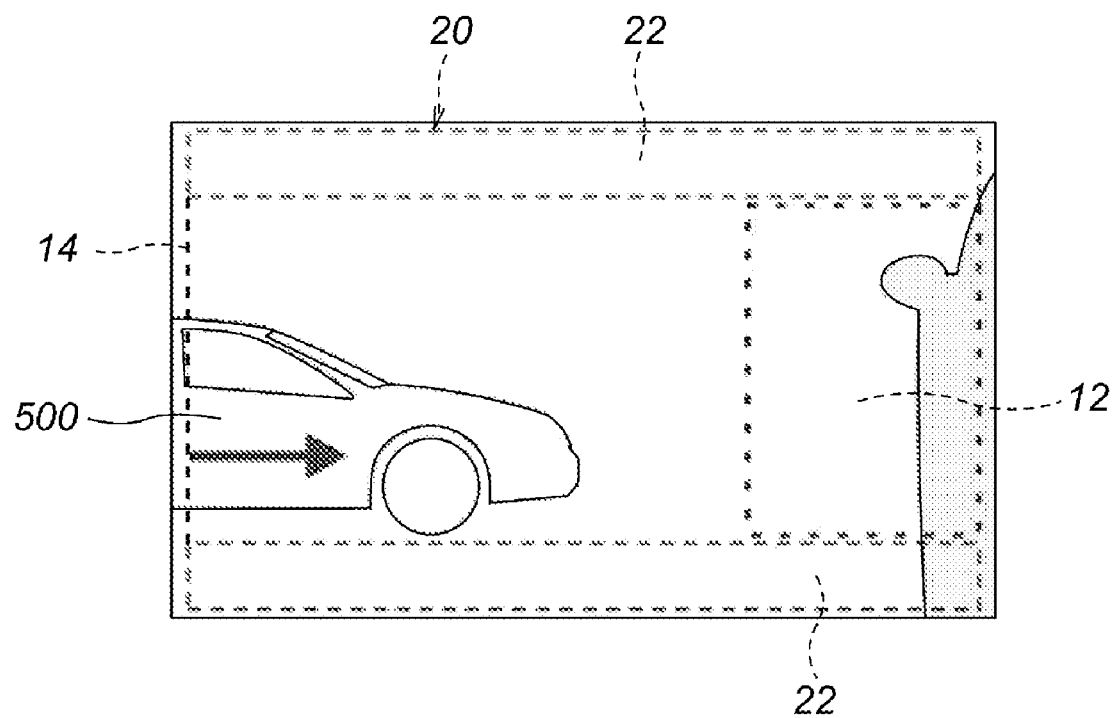
FIG. 13 is an explicative diagram showing another exemplary operation of a solid state camera made in accordance with principles of the disclosed subject matter.

An exemplary embodiment for detecting a side obstacle will now be described. When the solid state camera 20 shown by FIG. 2 is fixed to the left side of the vehicle 200, FIG. 13 shows image data that are produced by the solid state camera 20. The movement detecting area 14 of the solid state camera 20 can detect vector data of a vehicle, people and the like that come near the vehicle 200. Thus, the sensor system 100 can avoid a collision and can control an airbag system for which operation is carried out in consideration of a time till the collision.

More specifically, the movement detecting area 14 can photograph a vehicle 500 that comes near the vehicle 200 from a left side as shown in FIG. 13. However, the flow data size outputted from the movement detecting area 14 can be different depending on a state of the vehicle 200. When the vehicle 200 stops, the flow data size thereof may not basically change. However, when the vehicle 200 moves, the nearer the vehicle 200 goes towards the vehicle 500, the bigger the flow data size becomes, and the farther the vehicle 200 goes away from the vehicle, the smaller the flow data size becomes. Thus, the sensor system 100 can detect the colliding possibility with the vehicle 500 by detecting the speed of the vehicle 200 and its vector data.

Furthermore, when the distance detecting area 12 detects the vehicle 500, the sensor system 100 can also detect a part of the vehicle 200 that may collide with the vehicle 500. Thus, the sensor system 100 can judge whether there will be a collision or whether there will be collision avoidance, and can also control an airbag system depending on the case.

The distance detecting area 12 shown in FIG. 13 can detect a distance from an object such as an edge of a sidewalk, which can not be seen by a driver. In this case, when the sensor system 100 detects an object that exceeds a predetermined threshold, the sensor system 100 can provide a driver with a warning and can avoid the collision or other problem with the object by controlling a steering gear, providing notice, etc. In addition, because the distance detecting area 12 can output actual image data photographed thereby (as well can the movement detecting area 14 and an optical communication area 22), a driver can also confirm the object via the actual image data.

An exemplary embodiment for watching backwards will now be given. When fixing the solid state camera 20 shown by FIG. 2 to a rear of the vehicle 200, FIGS. 14(*a*) and 15(*a*) show image data photographed by the solid state camera 20. This image data differs from the data received when the camera is fixed to a front or a side of the vehicle and is fixed in a position rotated 90 degree leftwards about the camera's optical axis. In other wards, the solid state camera 20 can be fixed to a rear of the vehicle 200 so as to position the distance detecting area 12 downwards, the movement distance area 14 upwards and the optical communication areas 22 sideward.

In this case, when a vehicle 600 comes near the vehicle 200 as shown in FIG. 14(*a*), the sensor system 100 can detect downward vector data with the movement detecting area 14 as shown in FIG. 14(*b*). Specifically, when the vehicle 600 comes near the vehicle 200, the flow data of the back of vehicle 600 is outputted as downward vector data 602. The sensor system 100 can carry out the collision avoidance process and can warn a driver against the approaching back of vehicle 600, for example, increasing a brightness of a stoplight, turning on and off a stoplight and the like in accordance with the above described flow data.

When the vehicle 600 provides the same optical communication system as the solid state camera 20, the vehicle 600 can receive the information transmitted from the vehicle 200 and can also carry out the above described collision avoidance process, etc. Additionally, when an infrastructure such as a street light is provided with a transmission device for transmitting information, the sensor system 100 can also receive the surrounding information.

FIGS. 15(*a*)-(*b*) are exemplary embodiment in which the distance detecting area 12 is located downwards. The distance detecting area 12 allows the sensor system 100 to detect an obstacle and to measure a distance from a wall, etc., in an area where a driver may not be able to watch when moving backwards. The sensor system 100 can measure distances from people 700 and a vehicle 702, and can avoid the collision by a brake control and/or a warning when exceeding a predetermined threshold.

As described above, the solid state camera 10 including the distance detecting area 12 and the movement detecting area 14 can result in the effective output data for detecting an obstacle and watching a vehicle's surrounding and can be manufactured at a low cost. The solid state camera 20 including the distance detecting area 12, the movement detecting area 14 and the optical communication area 22 can also result in the effective output/input data for detecting an obstacle, watching the vehicle's surroundings and communicating with outside communication devices, and can also be produced at low cost.

The sensor system 100 including the solid state camera 10 and/or 20 can further result in the effective output/input control data from an operating result for detecting an obstacle and watching a vehicle's surrounding. For example, when fixing the sensor system 100 to the vehicle 200, because the sensor system 100 can recognize an obstacle in front of the vehicle 200 and can also measure a distance from it, the vehicle 200 can detect a possibility of colliding therewith. The sensor system 100 can also measure a distance from a vehicle to objects in a side direction of the vehicle 200, and can detect other vehicles and the like that come near the vehicle 200. In addition, the sensor system 100 can also detect an obstacle that can not be seen by a driver when moving in a backward direction of the vehicle 200.

When fixing the solid state camera 10 to the vehicle 200, the solid state camera 10 can output data for detecting other vehicles and obstacles that may collide with the vehicle 200, may come near the vehicle 200, and/or may move in a direction with respect to the vehicle 200. In addition, the solid state camera 10 can output the above described image data for review by the driver or for use by a system. When fixing the solid state camera 20 to the vehicle 200, the solid state camera 20 can output data similar to that output by the solid state camera 10, and can further output and input various data for communicating with an outside communication device.

In the above described exemplary embodiments of the disclosed subject matter, each form, size and location of the distance detecting area 12, the movement detecting area 14 and the optical communication area 22 in the solid state camera 10 and 20 are but a few examples. Each form, size and location of the distance detecting area 12, the movement detecting area 14 and the optical communication area 22 in the solid state camera 10 and 20 can be changed in accordance with the desired usage or particular application.

In the above described exemplary embodiments of the disclosed subject matter, the sensor system 100 including the solid state camera 10 and/or 20 is described when fixing the solid state camera 10 and/or 20 to a vehicle. The disclosed subject matter is not limited to use in a vehicle, and can be used for a sensor system of a robot, a security system, and the like.

An exemplary method in accordance with principles of the disclosed subject matter can include providing a solid state camera including a pickup surface configured to obtain data from an object, the camera including a distance detecting area located on the pickup surface, the distance detecting area including solid state photo-chips configured to detect a distance from the object, and a movement detecting area located on the pickup surface. The movement detecting area can include solid state photo-chips configured to detect a movement of the object, and possibly an optical communication area. The process of providing can include providing a light source configured to emit light to detect a distance from the object, an operating circuit, a synchronizing circuit, a control circuit, an encoder, a decoder, and a control circuit. The method can include receiving at least one of distance data and flow data from the solid state camera in the operating circuit, outputting at least one feedback signal related to the distance data from the operating circuit, and outputting obstacle data from the operating circuit. The method can also include causing the light source to emit light that includes at least one signal synchronized with the at least one feedback signal of the distance data outputted from the operating circuit via the synchronizing circuit. Receiving the obstacle data outputted from the operating circuit and outputting a control signal can be accomplished via the control circuit. The method can further include receiving image data via at least one of the distance detecting area and the movement detecting area. An optical communication area can be provided and located on the pickup surface, and the method can include providing solid state photo-chips configured to receive optical communication data, and can include encoding transmitting data and outputting encoded communication data via the encoder. The light source can be caused to emit light to transmit the encoded communication data encoded by the encoder. The synchronizing circuit can be used to cause the light source to emit light including at least one signal synchronized with the encoded communication data encoded by the encoder. The method can also include decoding data outputted from the solid state camera and outputting control data via the control circuit.

While there has been described what are at present considered to be exemplary embodiments of the disclosed subject matter, it will be understood that various modifications may be made thereto, and it is intended that the appended claims cover such modifications as fall within the true spirit and scope of the invention. All conventional art references described above are herein incorporated in their entirety by reference.

What is claimed is:

1. A solid state camera including a pickup surface for photographing an object, comprising:
    a distance detecting area located on the pickup surface, the distance detecting area including solid state photo-chips that are configured to detect a distance from the object to the pickup surface by a time of flight method; and
    a movement detecting area located on the pickup surface so as to share the pickup surface with the distance detecting area, the movement detecting area including solid state photo-chips that are configured to detect a movement of the object, wherein the pickup surface is divided into the distance detecting area and the movement detecting area and is configured to detect both a distance from the object to the pickup surface and the movement of the object while associating the distance detecting area with the movement detecting area.

2. The solid state camera including a pickup surface for photographing an object according to claim 1, further comprising:
    an optical communication area located on the pickup surface so as to share the pickup surface with the distance detecting area and the movement detecting area, the optical communication area including solid state photo-chips that are configured to receive optical communication data from outside devices.

3. A solid state camera including a pickup surface for photographing an object, comprising:
    a distance detecting area located on the pickup surface, the distance detecting area including solid state photo-chips that are configured to detect a distance from the object; and
    a movement detecting area located on the pickup surface, the movement detecting area including solid state photo-chips that are configured to detect a movement of the object, wherein each solid state photo-chip in the distance detecting area is larger than each solid state photo-chip in the movement detecting area.

4. The solid state camera including a pickup surface for photographing an object according to claim 2, wherein each solid state photo-chip in the distance detecting area is larger than each solid state photo-chip in the movement detecting area and the optical communication area.

5. The solid state camera including a pickup surface for photographing an object according to claim 1, wherein at least one of the distance detecting area and the movement detecting area is configured to receive image data.

6. The solid state camera including a pickup surface for photographing an object according to claim 2, wherein at least one of the distance detecting area, the movement detecting area, and the optical communication area is configured to receive image data.

7. The solid state camera including a pickup surface for photographing an object according to claim 3, wherein at least one of the distance detecting area and the movement detecting area is configured to receive image data.

8. The solid state camera including a pickup surface for photographing an object according to claim 4, wherein at least one of the distance detecting area, the movement detecting area, and the optical communication area is configured to receive image data.

9. The solid state camera including a pickup surface for photographing an object according to claim 1, wherein the solid state photo-chips in at least one of the distance detecting area and the movement detecting area are CMOS chips.

10. The solid state camera including a pickup surface for photographing an object according to claim 2, wherein the solid state photo-chips in at least one of the distance detecting area, the movement detecting area, and the optical communication area are CMOS chips.

11. The solid state camera including a pickup surface for photographing an object according to claim 3, wherein the solid state photo-chips in at least one of the distance detecting area and the movement detecting area are CMOS chips.

12. The solid state camera including a pickup surface for photographing an object according to claim 4, wherein the solid state photo-chips in at least one of the distance detecting area, the movement detecting area, and the optical communication area are CMOS chips.

13. A sensor system, comprising:
    a solid state camera including a pickup surface configured to obtain data from an object, the camera including
        a distance detecting area located on the pickup surface, the distance detecting area including solid state photo-chips configured to detect a distance from the object, and
        a movement detecting area located on the pickup surface so as to share the pickup surface with the distance detecting area, the movement detecting area including solid state photo-chips configured to detect a movement of the object, wherein the pickup surface is configured to detect both a distance from the object and the movement of the object while associating the distance detecting area with the movement detecting area;
    a light source configured to emit light to detect a distance from the object;
    an operating circuit configured to receive at least one of distance data and flow data from the solid state camera, to output at least one feedback signal related to the distance data, and to output obstacle data;
    a synchronizing circuit configured to cause the light source to emit light that includes at least one signal synchronized with the at least one feedback signal of the distance data outputted from the operating circuit; and a control circuit configured to receive the obstacle data outputted from the operating circuit and to output a control signal.

14. The sensor system of claim 13, wherein each solid state photo-chip in the distance detecting area is larger than each solid state photo-chip in the movement detecting area.

15. The sensor system of claim 13, wherein at least one of the distance detecting area and the movement detecting area is configured to receive image data.

16. The sensor system of claim 14, wherein at least one of the distance detecting area and the movement detecting area is configured to receive image data.

17. The sensor system of claim 13, wherein the solid state photo-chips in at least one of the distance detecting area and the movement detecting area are CMOS chips.

18. The sensor system of claim 14, wherein the solid state photo-chips in at least one of the distance detecting area and the movement detecting area are CMOS chips.

19. The sensor system of claim 13, wherein:
the camera further includes an optical communication area located on the pickup surface so as to share the pickup surface with the distance detecting area and the movement detecting area, the optical communication area including solid state photo-chips configured to receive optical communication data from outside devices; and
the system further includes an encoder configured to encode transmitting data and to output encoded communication data, wherein the light source is configured to emit light to transmit the encoded communication data encoded by the encoder, the synchronizing circuit is configured to cause the light source to emit light including at least one signal synchronized with the encoded communication data encoded by the encoder, and a decoder is configured to decode data outputted from the solid state camera and to output control data.

20. The sensor system of claim 19, wherein each solid state photo-chip in the distance detecting area is larger than each solid state photo-chip in the movement detecting area and the optical communication area.

21. The sensor system of claim 19, wherein at least one of the distance detecting area, the movement detecting area, and the optical communication area is configured to receive image data.

22. The sensor of claim 20, wherein at least one of the distance detecting area, the movement detecting area, and the optical communication area is configured to receive image data.

23. The sensor system of claim 19, wherein the solid state photo-chips in at least one of the distance detecting area, the movement detecting area, and the optical communication area are CMOS chips.

24. The sensor system of claim 20, wherein the solid state photo-chips in at least one of the distance detecting area, the movement detecting area, and the optical communication area are CMOS chips.

* * * * *